(12) United States Patent
Wersland

(10) Patent No.: US 9,552,011 B2
(45) Date of Patent: Jan. 24, 2017

(54) SYSTEM FOR MODIFYING THROTTLE CONTROL FOR UTV'S AND RELATED VEHICLES

(71) Applicant: Mikal Wersland, Bountiful, UT (US)

(72) Inventor: Mikal Wersland, Bountiful, UT (US)

(*) Notice: Subject to any disclaimer, the term of this patent is extended or adjusted under 35 U.S.C. 154(b) by 0 days.

(21) Appl. No.: 14/928,677

(22) Filed: Oct. 30, 2015

(65) Prior Publication Data

US 2016/0187916 A1 Jun. 30, 2016

Related U.S. Application Data

(60) Provisional application No. 62/072,814, filed on Oct. 30, 2014.

(51) Int. Cl.
*G05G 1/48* (2008.04)
*G05G 1/54* (2008.04)
*B60K 26/02* (2006.01)

(52) U.S. Cl.
CPC ................ *G05G 1/54* (2013.01); *B60K 26/02* (2013.01)

(58) Field of Classification Search
CPC ............ G05G 1/48; G05G 1/487; G05G 1/54; G05G 1/60; B60K 26/02; B60K 2026/026
See application file for complete search history.

(56) References Cited

U.S. PATENT DOCUMENTS

| | | | | |
|---|---|---|---|---|
| 1,128,975 A | * | 2/1915 | Harrington | G05G 1/487 74/562 |
| 1,293,101 A | * | 2/1919 | Hughes | G05G 1/487 74/562 |
| 1,441,669 A | * | 1/1923 | Egan | G05G 1/487 15/265 |
| 1,516,862 A | * | 11/1924 | Loury | G05G 1/60 74/564 |
| 2,124,100 A | * | 7/1938 | Bailcy | G05G 1/405 74/526 |
| 3,626,785 A | * | 12/1971 | Ross | B60K 26/02 74/512 |
| 4,218,937 A | * | 8/1980 | Albrecht | B60K 26/02 403/220 |
| 4,369,670 A | * | 1/1983 | Papenhagen | B60K 26/02 403/348 |
| 5,839,326 A | * | 11/1998 | Song | B60T 7/06 403/104 |
| 6,131,485 A | * | 10/2000 | Raja | G05G 1/487 180/334 |
| 6,883,398 B2 | * | 4/2005 | Kojima | B60T 7/06 74/514 |

* cited by examiner

*Primary Examiner* — Adam D Rogers
(74) *Attorney, Agent, or Firm* — Thorpe North & Western

(57) ABSTRACT

A throttle control modification assembly includes an attachment assembly configured to removably attach the modification assembly to an existing throttle pedal of a vehicle. A foot plank is coupled to the attachment assembly, the foot plank being configured to extend from the throttle pedal of the vehicle toward the floor of the vehicle.

8 Claims, 2 Drawing Sheets

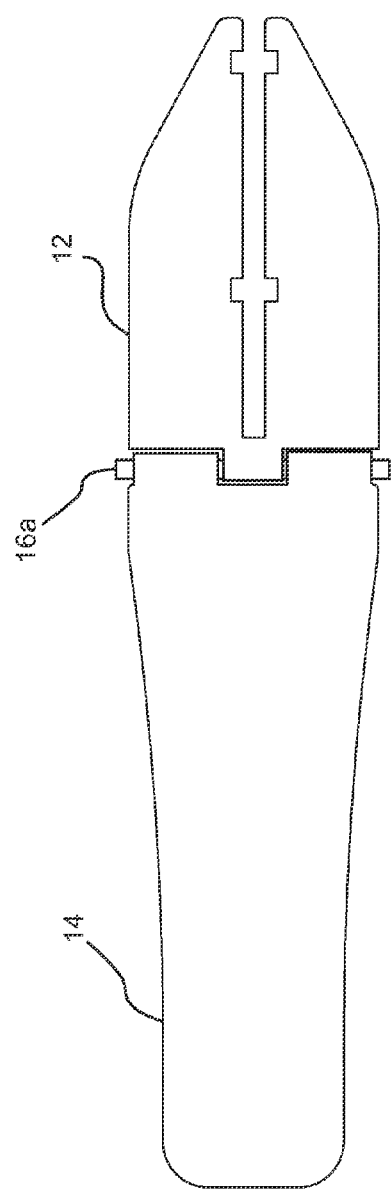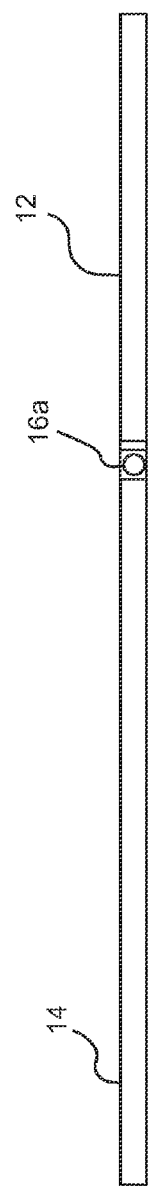

SYSTEM FOR MODIFYING THROTTLE CONTROL FOR UTV'S AND RELATED VEHICLES

PRIORITY CLAIM

Priority is claimed of and to U.S. Provisional Patent Application Ser. No. 62/072,814, filed Oct. 30, 2014, which is hereby incorporated herein by reference in its entirety.

BACKGROUND

The present invention relates generally to systems for use in modifying throttle assemblies of UTVs and related vehicles.

SUMMARY OF THE INVENTION

In accordance with one aspect of the invention, a throttle control modification assembly is provided, including an attachment assembly configured to removably attach the modification assembly to an existing throttle pedal of a vehicle. A foot plank can be coupled to the attachment assembly, the foot plank being configured to extend from the throttle pedal of the vehicle to the floor of the vehicle.

In accordance with another embodiment of the invention, a method of modifying an existing throttle pedal of a vehicle is provided, including: coupling an attachment assembly to an existing throttle pedal of the vehicle, the attachment assembly having a foot plank extending therefrom; and positioning an end of the foot plank upon a floor of the vehicle such that the foot plank is engageable by a foot of a driver of the vehicle.

In accordance with another embodiment of the invention, a method of operating a vehicle having an existing throttle pedal is provided, including: coupling an attachment assembly to an existing throttle pedal of the vehicle, the attachment assembly having a foot plank extending therefrom; positioning an end of the foot plank upon a floor of the vehicle such that the foot plank is engageable by a foot of a driver of the vehicle; positioning a first portion of a driver's foot upon the foot plank, and positioning a second portion of the driver's foot upon on the floor of the vehicle; and actuating the existing throttle pedal of the vehicle by depressing the first portion of the driver's foot thereby causing the foot plank to pivot about the end of the foot plank and depress the existing throttle pedal.

BRIEF DESCRIPTION OF THE DRAWINGS

Additional features and advantages of the invention will be apparent from the detailed description which follows, taken in conjunction with the accompanying drawings, which together illustrate, by way of example, features of the invention; and, wherein:

FIG. 1 is a top view of an exemplary throttle modification assembly in accordance with an embodiment of the technology;

FIG. 2 is a side view of the assembly of FIG. 1; and

Figure 3:
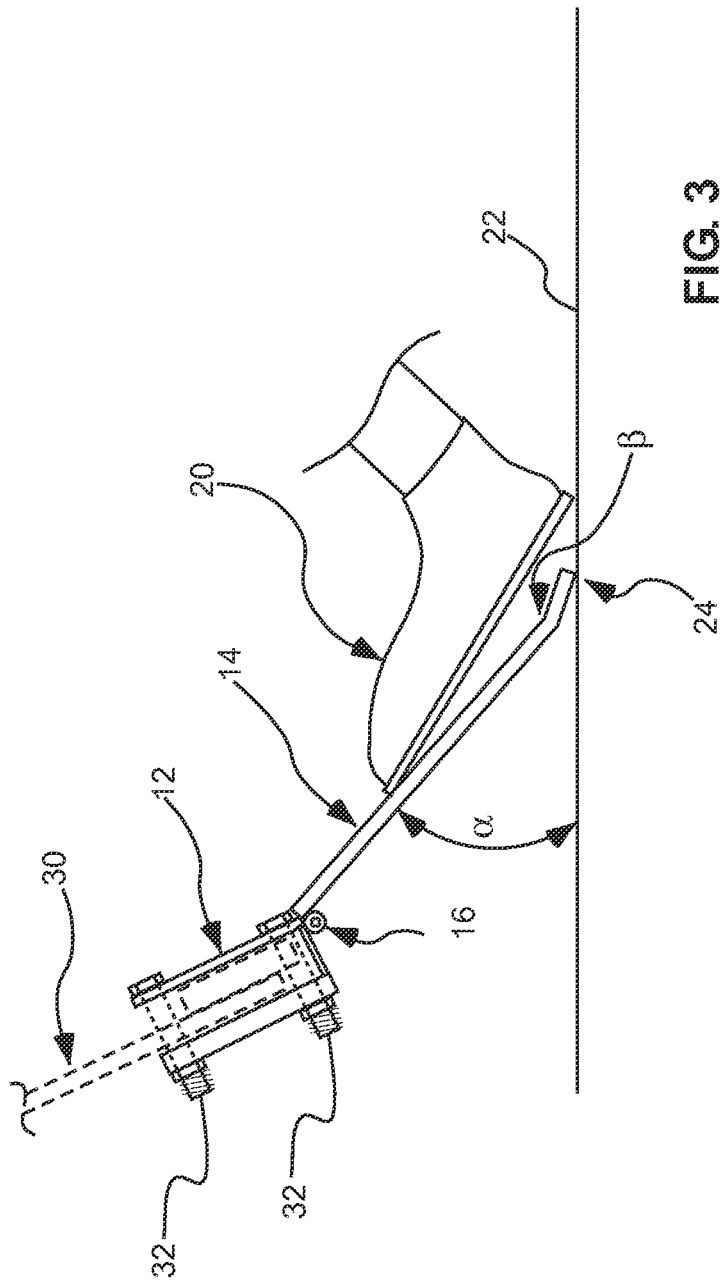
FIG. 3 is a schematic representation of a throttle modification assembly installed within a vehicle in accordance with an embodiment of the present technology.

Reference will now be made to the exemplary embodiments illustrated, and specific language will be used herein to describe the same. It will nevertheless be understood that no limitation of the scope of the invention is thereby intended.

DETAILED DESCRIPTION OF EXAMPLE EMBODIMENTS

The following detailed description of exemplary embodiments of the invention makes reference to the accompanying drawings, which form a part hereof and in which are shown, by way of illustration, exemplary embodiments in which the invention may be practiced. While these exemplary embodiments are described in sufficient detail to enable those skilled in the art to practice the invention, it should be understood that other embodiments may be realized and that various changes to the invention may be made without departing from the spirit and scope of the present invention.

In describing and claiming the present invention, the following terminology will be used.

The singular forms "a," "an," and "the" include plural referents unless the context clearly dictates otherwise. Thus, for example, reference to "fastener" can include reference to one or more of such fasteners.

As used herein, relative terms, such as "upper," "lower," "upwardly," "downwardly," etc., are used to refer to various components of the throttle modification systems discussed herein, and UTVs and related vehicles generally, as those terms would be readily understood by one of ordinary skill in the relevant art. It is to be understood that such terms in no way limit the present invention but are used to aid in describing the components of the present systems, and UTVs and related vehicles generally, in the most straight-forward manner.

As used herein, the term "substantially" refers to the complete or nearly complete extent or degree of an action, characteristic, property, state, structure, item, or result. For example, when an object or group of objects is/are referred to as being "substantially" symmetrical, it is to be understood that the object or objects are either completely symmetrical or are nearly completely symmetrical. The exact allowable degree of deviation from absolute completeness may in some cases depend on the specific context. However, generally speaking the nearness of completion will be so as to have the same overall result as if absolute and total completion were obtained.

The use of "substantially" is equally applicable when used in a negative connotation to refer to the complete or near complete lack of an action, characteristic, property, state, structure, item, or result. For example, an opening that is "substantially free of" material would either completely lack material, or so nearly completely lack material that the effect would be the same as if it completely lacked material. In other words, an opening that is "substantially free of" material may still actually contain some such material as long as there is no measurable effect as a result thereof.

As used herein, the term "oblique angle" is used to refer to an angle that is neither 90 degrees, nor a multiple of 90 degrees (e.g., it is neither 0, 90, 180, 270 nor 360 degrees).

Invention

The present invention provides apparatuses and methods for modifying throttle systems of various UTVs, ROVs, "side-by-sides," and the like. Such vehicles include a foot pedal throttle component that allows a rider to control the throttle (and thus the engine speed) of the UTV with his or her foot. In most cases, the foot pedal component of the existing throttle control system is suspended slightly above the floor of the UTV. A driver of the UTV generally rests his or her heel upon the floor of the UTV and rests the ball of her foot (or the toe or the sole of the foot) upon the foot pedal to depress the foot pedal to increase engine speed.

While such systems provide a functional interface between the rider and the throttle control, it has proven difficult, with most conventional systems, to maintain a constant engine speed when navigating the UTV over rough terrain. This is because the driver is attempting to maintain his foot in position, while also very delicately balancing the force applied to the throttle control. In addition to making speed control difficult, many riders complain of ankle, foot and/or shin fatigue after operating the vehicle for any significant period of time.

The present system advantageously allows a user to modify the interface between a rider's foot and the throttle control provided on many commercially available foot pedal assemblies. The resulting assembly provides a much more comfortable interface for the rider, and allows the rider to more accurately maintain throttle control in rough terrain. The present system can be relatively easily and quickly installed by users having only minimum mechanical aptitude. Very few tools are required to install the present technology, and in some cases no tools are required.

The present technology can be adapted to operate properly with nearly any commercially available UTV configuration. While much of the discussion herein will focus on use of the technology with UTVs (sometimes called "side-by-sides" or "side-by-side ATVs"), it is to be understood that the technology is not limited to this application. The throttle control system can be used with a variety of ATVs, golf-cart style vehicles, automobiles, and the like.

FIG. 3 illustrates schematically an exemplary throttle modification system attached to a UTV in accordance with an example of the technology. In this example, the existing throttle assembly is shown in dashed lines at 30. This factory-provided assembly typically includes a downwardly extending arm that can include a rubberized pad or similar structure that the driver would otherwise engage with his or her foot. It is understood that the throttle assembly provided with vehicles can vary widely, depending upon the design of the throttle pedal, the assembly connecting the throttle pedal to the engine, the floor and cab design, etc. For this reason, the throttle control assembly is shown in FIG. 3 schematically, and not in great detail. Components of the UTV, other than the floor and throttle pedal, are omitted for simplicity. It is to be understood that one of ordinary skill having possession of this disclosure in the art would readily appreciate the installation and operation of the present technology with a wide range of UTV designs.

The present system provides a throttle control modification assembly that can include an attachment assembly 12 that is configured to attach the assembly to the existing throttle pedal or control 30 of a vehicle. A foot plank 14 can extend from the attachment assembly to rest upon the floor 22 of the vehicle. The foot plank is coupled to the attachment assembly, which in turns couples the foot plank to the existing throttle pedal 30. Thus, the foot plank spans the distance from the existing throttle pedal to the floor of the vehicle.

While not so required, in one aspect of the invention, the foot plank 14 can be pivotally coupled to the attachment assembly 12. This is shown by example via pivotal joint 16, which can include pin 16a, for example. This can enable the system to be coupled to a range of differing throttle assemblies and still function properly. This can also allow the modification assembly to operate more smoothly, as the plank can pivot about 16, with the contact point 24 being able to slide slightly along the floor surface 22. The pivoting interface between the foot plank and the attachment assembly also allows a distance of the point at which the foot plank engages the floor 22 of the vehicle to be varied. The attachment assembly can securely (in many cases, flatly) engage the existing throttle pedal, while the foot plank can angle away from the throttle pedal at a more gradual slope than otherwise obtainable. Thus, the contact point at which the foot plank engages the floor can be moved rearwardly from the existing pedal, as compared to a non hinged or pivoted system.

In one aspect of the invention, the foot plank 14 includes an angled or engagement adjacent the end 24 of the plank that rests upon the floor 22 of the vehicle. The angled section extends from the foot plank proper at an angle shown as "β." This angle can be about 10 degrees, and can provide a more secure interface between the foot plank and the floor surface 22. By provided a more gradual contact interface with the floor 22, the end of the foot plank contacting the floor can more easily slide back and forth along the floor surface. Contrast this with a foot plank that is simply "spiked" into the floor at a single contact point, which would not slide easily across the floor.

As will be appreciated, the foot plank can be more easily engaged with the rider's foot 20 than is the existing throttle 30. This allows the rider to more easily and consistently control the speed of the vehicle engine. This has the added benefit of avoidance of fatigue while driving for extended periods of time.

As also shown in FIG. 3, in one aspect of the invention, once the throttle control modification assembly is coupled existing throttle 30, the foot plank 14 forms an angle "α" with the floor 22 of the vehicle. This angle decreases as the user depresses the foot plank (which in turn causes the throttle to increase the engine speed of the vehicle). The end 24 of the foot plank that is engaging the floor 22 can also slide along the floor 22, allowing the angle "α" to decrease as the throttle is depressed. It has been found that decreasing the angle at which the driver's foot must be maintained while driving the vehicle greatly enhances the comfort and drivability of the system. Also, less calf muscle strength is required to depress the existing throttle pedal.

The attachment assembly 12 can include a variety of components. In one example, the attachment assembly includes a relative simple component, such as that shown in FIGS. 1 and 2, that engages the existing throttle 30 in a specific manner. The slots shown can be fitted over structure already present in the existing throttle pedal. In other embodiments, the attachment assembly can include fasteners 32 that allow removable fastening of the attachment assembly to the existing throttle. Due to the wide variance in the configuration of existing throttles, the present system can be provided with a wide range of attachment assembly configurations. The assembly can be attached beneath an existing throttle, or above such a throttle. The assembly can at least partially encompass the existing throttle, or can be inserted into or between various components of the existing throttle.

In some cases, the attachment assembly 12 can be installed upon, or over, under or around the existing throttle with no modification of the existing throttle being necessary. In other cases, the existing throttle may be modified (by removing various pieces thereof, for example) to allow a more secure interface between the existing throttle and the attachment assembly.

The foot plank 14 and attachment assembly 12 can be formed from a variety of materials. In one aspect, these components (or pieces of these components) can be formed from a metallic material, such as steel, aluminum and the like. In other embodiments, the components can include a relatively rigid inner core formed from a metallic material, with a softer outer material (such a pliable polymeric material) applied about these components. Rigid polymers can also be used to provide a desired stiffness to these components. Generally speaking, the portion of the attachment assembly 12 shown in FIGS. 1 and 2, and the foot plank 14 are fairly rigid, as minimal deflection is desired.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

I claim:

1. A method of operating a vehicle having an existing throttle pedal, comprising:
   coupling an attachment assembly to the existing throttle pedal of the vehicle, the attachment assembly having a foot plank extending therefrom;
   positioning an end of the foot plank upon a surface of a floor of the vehicle such that the foot plank is engageable by a foot of a driver of the vehicle, the end of the foot plank contacting and being slideable along the surface of the floor of the vehicle;
   positioning a first portion of the driver's foot upon the foot plank, and positioning a second portion of the driver's foot upon on the surface of the floor of the vehicle such that the second portion of the driver's foot is in contact with and slideable along the surface of the floor of the vehicle; and
   actuating the existing throttle pedal of the vehicle by depressing the first portion of the driver's foot thereby causing the foot plank to pivot about the end of the foot plank and depress the existing throttle pedal.

2. The method of claim 1, wherein the foot plank is pivotally coupled to the attachment assembly.

3. The method of claim 1, wherein the foot plank includes an angled section adjacent the end of the foot plank that is slideable along the floor of the vehicle, the angled section extending from the foot plank at an oblique angle.

4. The method of claim 1, further comprising one or more fasteners associated with the attachment assembly, the one or more fasteners operable to removably attach the attachment assembly to the existing throttle pedal.

5. The method of claim 1, wherein actuating the existing throttle pedal of the vehicle by depressing the first portion of the driver's foot causes the end of the foot plank that is in contact with the surface of the floor of the vehicle to slide along the surface of the floor of the vehicle.

6. The method of claim 1, wherein positioning the second portion of the driver's foot upon on the surface of the floor of the vehicle comprises positioning the second portion of the driver's foot rearwardly of the end of the foot plank in contact with the surface of the floor of the vehicle.

7. The method of claim 6, wherein the second portion of the driver's foot and the end of the foot plank are independently slidable upon the surface of the floor of the vehicle.

8. The method of claim 1, wherein a distance between the end of the foot plank in contact with the surface of the floor and a point where the second portion of the driver's foot contacts the surface of the floor varies as the existing throttle pedal is actuated.

\* \* \* \* \*